United States Patent Office 2,923,740
Patented Feb. 2, 1960

2,923,740

PREPARATION OF TRIALKYLBORANES

Lewis S. Stone, Evans City, Pa., assignor to Callery Chemical Company, Pittsburgh, Pa., a corporation of Pennsylvania No Drawing. Application December 16, 1955
Serial No. 553,430

7 Claims. (Cl. 260—606.5)

This invention relates to the preparation of lower trialkyl boranes having the general formula, $R_3B$, where R is a lower alkyl radical containing not more than five carbon atoms. In particular, it relates to a new and improved method for preparing these compounds by the reaction of boron trichloride with a tetraalkyl lead compound.

The lower trialkyl boranes are all well known and well characterized chemical compounds. Several methods for their preparation have been reported in the literature some of which have been patented. Stock and Zeidler first prepared trimethylborane and triethylborane in 1921 by the reaction of $BCl_3$ with dimethylzinc and diethylzinc respectively in a high vacuum system. The yields were low and the zinc compounds themselves were difficult to prepare. A more general preparative method for all the lower trialkyl boranes, including triamylborane, is the reaction of the appropriate Grignard reagent with gaseous $BF_3$ or boron trifluoride ethyl etherate. In this manner, yields of 50 to 80% have been obtained. American and British patents have been granted for a process of making trimethylborane in which the vapors of a boron halide and an alkyl halide are passed over heated aluminum or zinc; e.g., $BBr_3$ and methyl chloride are passed through 20-mesh aluminum granules at 350° C. The products are collected at −80° C. and fractionally distilled. In a similar patented process, methyl chloride is passed through activated aluminum at 15–75 p.s.i.g. and 75–100° C. and the resulting mixture is treated with $BF_3$ or $BF_3 \cdot (C_2H_5)_2O$ at 50–70° C. for two hours to give trimethylborane. A patented method for the preparation of triethylborane and higher alkylboranes involves the passage of ethylene through $AlCl_3$ and activated aluminum at 750–3000 p.s.i.g. and 100–200° C., and treatment of the resulting mixture with $BF_3$ or $BF_3 \cdot (C_2H_5)_2O$ at 50–70° C. for two hours. Another method of preparing triethylborane involves heating a mixture containing 2% diborane and 98% ethylene for four days at 100° C. The method described in the present invention is considered to be a major improvement over all the existing processes in that quantitative yields of trialkyl boranes are obtained.

It is one object of this invention to provide a new and improved method for preparing lower alkyl boranes in substantially quantitative yields.

Another object is to provide a simple and efficient method for preparing lower trialkyl boranes by the reaction of boron trichloride with a tetraalkyl lead compound.

Other objects will appear from time to time throughout the following specification and appended claims.

This new and improved method for preparing trialkyl boranes will be more fully described hereinafter and the novelty thereof will be particularly pointed out and distinctly claimed.

The present invention is based upon the discovery that lower trialkyl boranes up to and including triamylborane can be prepared in excellent yield by the following general reaction:

$$3R_4Pb + 2BCl_3 \rightarrow 3R_2PbCl_2 + 2BR_3$$

where R is a lower alkyl radical. The $R_2PbCl_2$ can be readily decomposed to form the tetraalkyl lead and lead chloride. If a substantial excess of $BCl_3$ is used the initial reaction may go to lead chloride which makes the recovery of the lead much more difficult.

In one experiment, trimethylborane was prepared as follows: in a suitable round-bottomed, 3-necked flask equipped with a high-speed stirrer, dropping funnel, nitrogen inlet and a reflux condenser was placed 0.50 mol (134 g.) of tetramethyllead. To the vigorously stirred tetramethyllead was added slowly in a nitrogen atmosphere 0.17 mol (20 g.) of condensed boron trichloride. An instantaneous exothermic reaction took place and a white solid was precipitated. The reaction mixture was warmed to about 50° C. and the gaseous product generated was collected in a trap cooled with liquid nitrogen. Vacuum distillation of the condensed product resulted in a 90 mol percent yield of trimethylborane based on the boron trichloride used. When a portion of the trimethylborane obtained was allowed to warm up and escape into the atmosphere, it ignited spontaneously.

In another experiment, triethylborane was prepared in the following manner: in a suitable, round-bottomed, 3-necked flask equipped with a high-speed stirrer, dropping funnel, nitrogen inlet and a reflux condenser was placed 15 ml. (24.9 g.) of tetraethyllead. Approximately 15 g. of boron trichloride were introduced slowly into the flask above the surface of the vigorously stirred tetraethyllead. Considerable heat was evolved and a white solid precipitated. When the reaction was complete, the reflux condenser was replaced with a short fractionating column and the triethylborane formed was distilled under an atmosphere of nitrogen and collected in a trap cooled with liquid nitrogen. The triethylborane was further purified by washing with water to remove any excess boron trichloride dissolved therein. The washed triethylborane which is insoluble in water was then complexed with anhydrous ammonia and distilled away from the remaining impurities. Pure triethylborane was removed from the ammonia complex by treatment with anhydrous hydrogen chloride and subsequent distillation. The yield was substantially quantitative.

It was found that other lower trialkyl boranes such as tripropyl-, tributyl- and triamylboranes can be prepared in a similar fashion by treatment of the corresponding tetraalkyl lead compound with boron trichloride. These reactions will take place in the presence of a solvent for the tetraalkyl lead provided the solvent is not attacked by the boron trichloride. However, it is preferable to carry out the reaction without a solvent.

Having thus described this invention with the particularity and distinctness required by the patent statutes, it should be understood that other variations are possible and that within the scope of the appended claims, this invention may be practiced otherwise than as specifically described.

What I desire to particularly point out and distinctly claim as my invention is:

1. A method of preparing tri- lower alkyl boranes which comprises reacting under an inert atmosphere boron trichloride with a tetra lower alkyl lead compound and recovering the tri lower alkyl borane evolved.

2. A method according to claim 1 in which the tetraalkyl lead compound is selected from the class having the general formula $R_4Pb$ where R is a lower alkyl radical containing not more than five carbon atoms.

3. A method according to claim 1 in which tetramethyllead is allowed to react with boron trichloride and the trialkyl borane recovered is trimethylborane.

4. A method according to claim 1 in which tetraethyllead is allowed to react with boron trichloride and the trialkyl borane recovered is triethylborane.

5. A method of preparing trimethylborane which comprises adding boron trichloride to vigorously agitated tetramethyllead in an inert atmosphere, warming the reaction mixture to about 50° C., collecting the evolved gases in a cold trap and recovering the trimethylborane by vacuum distillation of the condensed gases.

6. A method of preparing triethylborane which comprises adding boron trichloride to vigorously agitated tetraethyllead in an inert atmosphere, distilling the reaction mixture under an inert atmosphere and collecting the triethylborane formed in a cold trap.

7. A method according to claim 6 in which the triethylborane collected is purified by washing with water, complexing the washed triethylborane with ammonia, distilling the resulting ammonia complex away from impurities and recovering the ammonia complex, then treating said ammonia complex with hydrogen chloride and redistilling to recover the triethylborane.

References Cited in the file of this patent

Stock et al.: Ber. 54, pp. 531–41 (1921).
Leeper et al.: Chem. Rev. 54, pp. 101–167 (February 1954); pp. 112–113 relied on.